United States Patent

Yamaoka et al.

Patent Number: 5,205,588
Date of Patent: Apr. 27, 1993

[54] SHOULDER ADJUSTER

[75] Inventors: Mikimasa Yamaoka, Osaka; Noriyuki Kosugi, Shiga, both of Japan

[73] Assignee: Takata Corporation, Tokyo, Japan

[21] Appl. No.: 740,702

[22] Filed: Aug. 5, 1991

[30] Foreign Application Priority Data

Sep. 5, 1990 [JP] Japan ............................ 2-235059

[51] Int. Cl.$^5$ ............................................ B60R 22/20
[52] U.S. Cl. ................................................ 280/801 A
[58] Field of Search ................ 280/801, 808, 801 A; 297/468, 483

[56] References Cited

U.S. PATENT DOCUMENTS

| 4,398,749 | 8/1983 | Hipp et al. | 280/801 |
|---|---|---|---|
| 4,453,741 | 6/1984 | Hipp et al. | 280/808 |
| 4,569,537 | 2/1986 | Else | 280/808 |
| 4,786,081 | 11/1988 | Schmidt | 280/808 |
| 4,895,392 | 1/1990 | Schut et al. | 280/801 |
| 4,909,541 | 3/1990 | Tokugawa | 280/804 X |
| 5,044,666 | 9/1991 | Griesemer | 280/808 |

FOREIGN PATENT DOCUMENTS 0230798 8/1987 European Pat. Off. .
2206032 12/1988 United Kingdom .
2213700 8/1989 United Kingdom .

Primary Examiner—Tamara L. Graysay
Attorney, Agent, or Firm—Kanesaka and Takeuchi

[57] ABSTRACT

A shoulder adjuster includes a guide rail fitted so that the longitudinal direction is set as a vertical direction to a vehicle and provided with a plurality of notches formed at intervals in the longitudinal direction; and a slide member slidable in the longitudinal direction of the guide rail and having engaging parts engaging with the notches and a shoulder anchor fitting part. The notches have cut-in edge parts positioned on the underside in the vertical direction and substantially orthogonal to the longitudinal direction of the guide rail and cut-in edge parts positioned on the upside in the vertical direction and obliquely to the longitudinal direction as to expand apertures of the notches. The slide member has an anchor fitting part to provide advancement and retreatment in the engaging direction and includes an elastic member for biasing the anchor fitting part in the engaging direction. The engaging parts are integral with the anchor fitting part and biased by the elastic member in the engaging direction.

6 Claims, 3 Drawing Sheets

SHOULDER ADJUSTER

BACKGROUND OF THE INVENTION

1. Field of the Invention:

The present invention relates generally to a shoulder adjuster for use with a seat belt device for restraining and protecting seat occupants in the event of emergency such as a vehicle collision, and more particularly, to a shoulder adjuster of the seat belt for restraining the occupants on the front seats of, e.g., an automobile.

2. Description of the Prior Art:

The following is one arrangement of the seat belt devices for protecting occupants on the front seats of, e.g., an automobile. A shoulder adjuster is fitted to a center pillar of the automobile. A seat belt is folded back by a shoulder anchor attached to the shoulder adjuster, whereby the seat belt can be fed out to the seat occupant.

This shoulder adjuster is constructed to make a height of the shoulder anchor variable corresponding to a seated height of the occupant and a body shape thereof. The shoulder adjuster includes a guide rail extending in the up-and-down directions and a slide member slidable along the guide rail. The shoulder anchor is attached to the slide member.

One example of the shoulder adjuster will be given (U.S. Pat. No. 4,398,749). The guide rail is formed with a multiplicity of notches at intervals in the longitudinal direction. The slide member has engaging parts with the notches and an elastic member for biasing the engaging parts in the engaging direction. Lower cut-in edge parts of the notches are substantially orthogonal to the longitudinal direction. Upper cut-in edge parts are made obliquely to the longitudinal direction to expand apertures of the notches.

In the shoulder adjuster of the foregoing patent, when the slide member is biased upwards, the engaging parts move while running over the upper cut-in edge parts (inclined to the longitudinal direction) of the notches. The slide member slides upwards. When an external force acting downward from the seat belt is applied to this slide member, the engaging parts are engaged with the lower cut-in edge parts (substantially orthogonal to the longitudinal direction) of the notches. Downward sliding of the slide member is thereby hindered.

Note that the shoulder adjuster of the foregoing patent with the is provided with a member dedicated to thrust the engaging parts in a direction opposite (hereinafter referred to as a release direction) to the engaging direction. When pushing this member, the engagement of the engaging parts with the notches is released, whereby the slide member is slidable downwards.

As described above, the shoulder adjuster of U.S. Pat. No. 4,398,749 requires the member for thrusting the engaging parts in the release direction. This member is disposed upwardly of the anchor fitting part. Hence, a pull-down of the slide member involves two steps of lowering the slide member in the downward direction while pushing this member. This shoulder adjuster is therefore hard to use.

The device of the foregoing patent presents the following drawback. The user can not recognize that the slide member is slidable downwards by pushing the dedicated member unless the user reads thoroughly the operation manual or repeatedly makes a variety of trails and errors, resulting in a difficulty to comprehend the operating method.

OBJECT AND SUMMARY OF THE INVENTION

It is a primary object of the present invention to provide a shoulder adjuster capable of easily pulling down a slide member.

It is therefore another object of the present invention to provide a shoulder adjuster capable of highly facilitating a height adjustment of a shoulder anchor.

It is still another object of the present invention to provide a shoulder adjuster capable of presenting an easy-to-comprehend operating method.

To accomplish the foregoing objects, according to one aspect of the invention, there is provided a shoulder adjuster comprising: a guide rail fitted so that the longitudinal direction is set as a vertical direction to a vehicle and provided with a plurality of notches formed at intervals in the longitudinal direction; and a slide member slidable in the longitudinal direction of the guide rail and having engaging parts engaging with the notches and a shoulder anchor fitting part, wherein each notch has a cut-in edge part positioned on the underside in the vertical direction and substantially orthogonal to the longitudinal direction of the guide rail and a cut-in edge part positioned on the upside in the vertical direction and obliquely to the longitudinal direction as to expand an aperture of the notch and the slide member has the anchor fitting part to provide advancement and retreatment in the engaging direction and includes an elastic member for biasing the anchor fitting part in the engaging direction, the engaging parts being integral with the anchor fitting part and biased by the elastic member in the engaging direction.

The shoulder adjuster according to the present invention eliminates the necessity for a member, different from an anchor fitting part, for thrusting the engaging parts in a release direction. In the shoulder adjuster of this invention, when intruding the anchor fitting part, the engaging parts separate from the notches. The slide member slides downwards as it is. Hence, the slide member is slidable downwards by a single step of lowering it while intruding the anchor fitting part.

As a matter of course, the engaging parts engage with the notches upon releasing the anchor fitting part from the hand. The slide member is locked to the guide rail, thereby protecting the seat occupant. Whereas the anchor fitting part is pushed up, as in the same way with U.S. Pat. No. 4,398,749, the engaging parts run over the upper side edge parts of the notches, whereby the slide member slides upwards.

BRIEF DESCRIPTION OF THE DRAWINGS

Other objects and advantages of the present invention will become apparent during the following discussion taken in conjunction with the accompanying drawings, in which.

DETAILED DESCRIPTION OF THE PREFERRED EMBODIMENT

Figure 2:
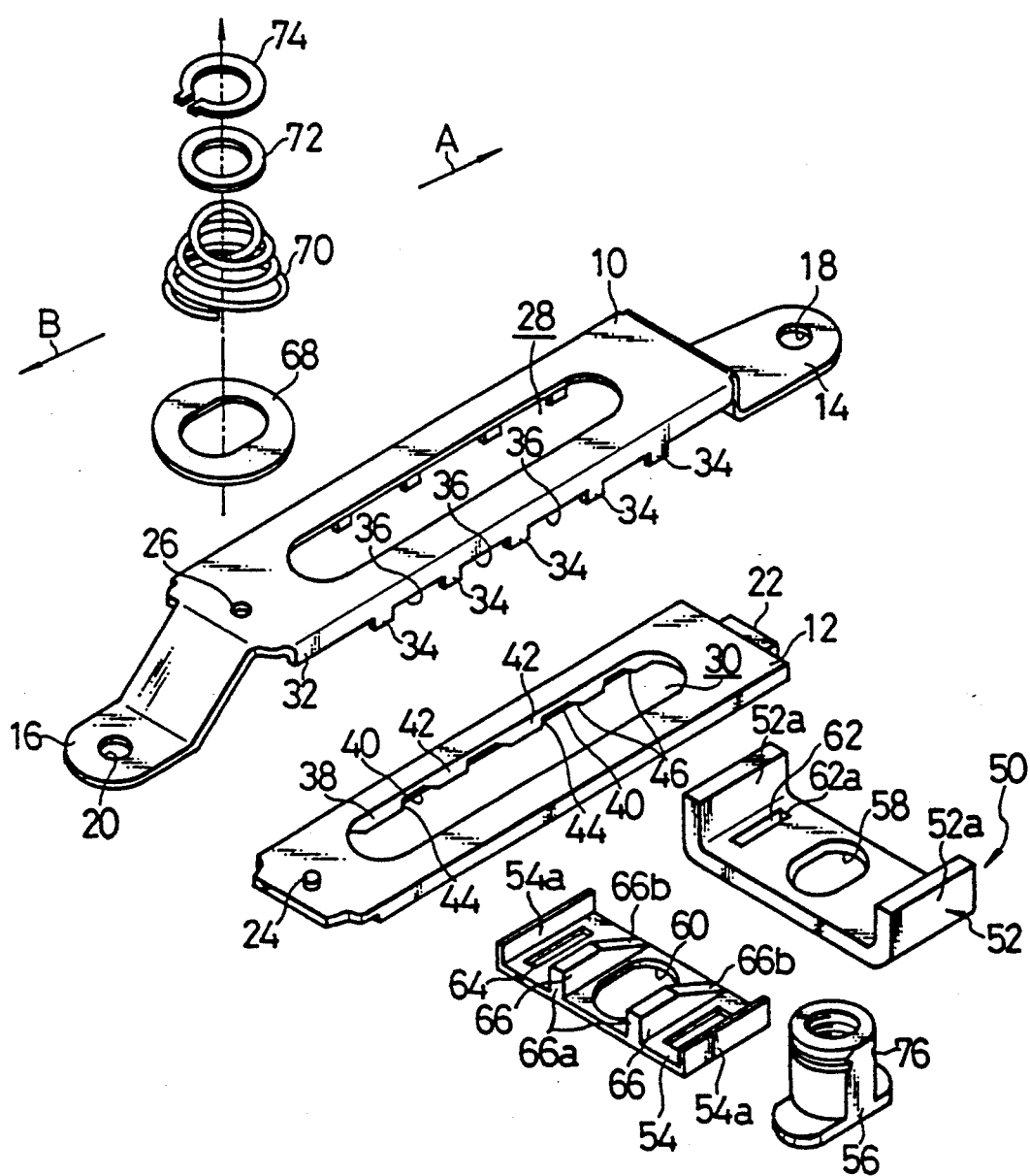
FIG. 2 is an exploded perspective view depicting the same adjuster.

To start with, the components will be explained referring mainly to FIG. 2. The numeral 10 represents a metal guide rail. The numeral 12 denotes a synthetic resin guide rail. These guide rails 10 and 12 are elongate members each extending in one direction. The guide rails are fitted in such a way that the longitudinal directions thereof are set as vertical directions to the vehicle. The metal guide rail 10 includes brackets 14 and 16 extending from upper and lower parts thereof. Bored in the upper and lower brackets 14 and 16 are bolt holes 18 and 20 for fixing the guide rail 10 to a center pillar (not illustrated) of the vehicle.

The synthetic resin guide rail 12 has a tongue piece 22 protruding at one end in the longitudinal direction and also a protrusion 24 protruding from a plate surface at the other end (lower end). The tongue piece 22 is inserted into a slit-like opening (not shown) formed in a root part of the bracket 14. The protrusion 24 is fitted in a small hole 26 formed in the lower end portion of the metal guide rail 10. The tongue piece 22 and the protrusion 24 are fitted therein, whereby the synthetic resin guide rail 12 becomes integral with the metal guide rail 10 while being overlapped with each other.

Slots 28 and 30 extending in the longitudinal directions are so formed in the guide rails 10 and 12 that the slots coincide with each other in the overlapped state.

The metal guide rail 10 assumes such a configuration as to form flanges 32, which are formed by folding the outer fringes of the guide rail. The flange 32 has pawls 34 so disposed at predetermined intervals as to project therefrom. Recesses 36 are formed between the respective pawls 34.

The synthetic resin guide rail 12 assumes such a configuration that longer side portions along the slot 30 are folded. A side-folded flange 38 is formed with notches 40 at predetermined intervals. Protrusions 42 are shaped between the notches 40.

This notch 40 has a cut-in edge part (hereinafter referred to as a vertical surface in some cases) 44 positioned on the underside when the shoulder adjuster is mounted in the vehicle, this cut-in edge part being orthogonal to the guide rail 12. The notch 40 also has a cut-in edge part (hereinafter referred to as an inclined surface in some cases) 46 positioned on the upside obliquely to the longitudinal direction of the guide rail 12 to expand the aperture of the notch 40.

Note that the pawls 34 are arrayed and have their sizes adaptive to conceal the protrusions 42 when viewing them sideways in a state where the guide rails 10 and 12 are joined.

Figure 1:
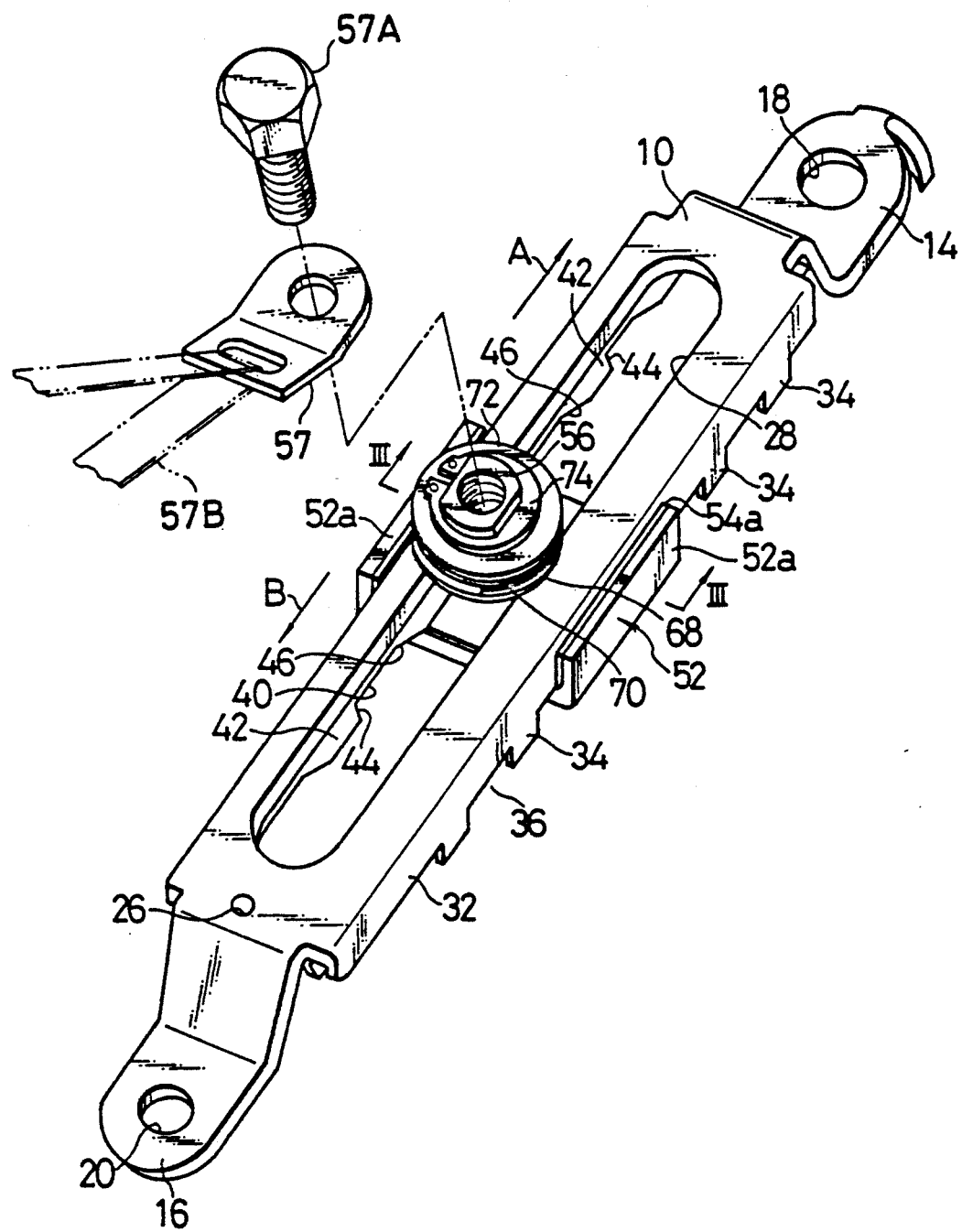
FIG. 1 is a perspective view illustrating a shoulder adjuster in an embodiment of the present invention.

Provided is a slide member 50 movable in the longitudinal directions along the integrally arranged guide rails 10 and 12. This slide member 50 is composed mainly of a metal slider 52, a synthetic resin slide 54 and a nut 56 serving as an anchor fitting part. As illustrated in FIG. 1, a shoulder anchor 57 is fastened to the nut 56 with a bolt 57A. A seat belt 57B is stretched through the shoulder anchor 57.

The metal slider 52 assumes a substantially C-like shape in section. The slider 52 includes a side-folded flange 52a disposed along the outer side surfaces of the flange 32 of the metal guide rail 10. The synthetic resin slider 54 assumes a substantially C-like shape adaptive to fit in the metal slider 52. A side-folded flange 54a thereof is interposed between the flanges 32 and 52a, thus hindering a direct metal touch of the metal slider 52 to the metal guide rail 10.

Apertures 58 and 60 for an insertion stop of the nut 56 are formed in the sliders 52 and 54 so that these apertures open in coincident positions while the sliders 52 and 54 are superposed on each other. Similarly, the sliders 52 and 54 are formed with through-holes 64 and engagement holes 62, into which the pawls 34 of the metal guide rail 10 are inserted. The synthetic resin slider 54 has trapezoidal engaging parts 66 protruded to extend along the two side portions of the aperture 60.

The nut 56 is inserted through the apertures 58, 60, the slot of the synthetic resin guide rail 12 and the slot 28 of the metal guide rail 10. A slide washer 68, a spring 70 and a stop ring 72 are externally fitted to the top end of the nut 56. A C-ring 74 is fitted in a peripheral groove 76 furrowed in the top end portion of the nut 56, whereby the spring 70 is mounted on the nut 56.

Figure 3:
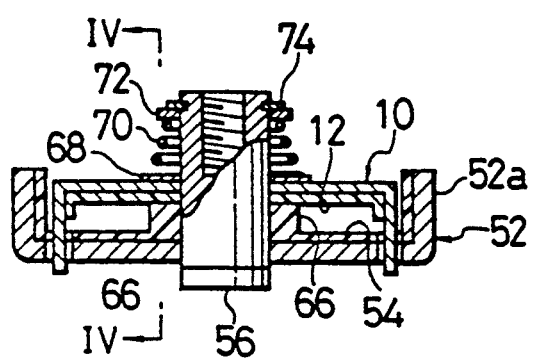
FIG. 3 is a sectional view taken substantially along the line III—III of FIG. 1.
Figure 4:
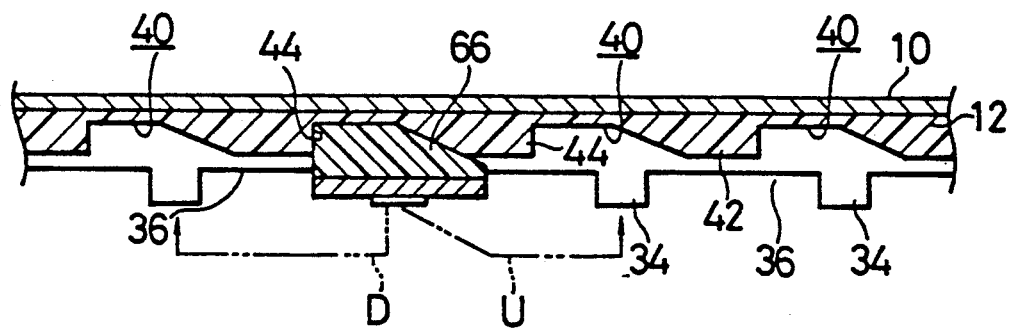
FIG. 4 is an operation explanatory sectional view taken substantially along the line IV—IV of FIG. 3 in the longitudinal direction of a guide rail.

As illustrated in FIGS. 1, 3 and 4, when the slide member 50 engages with the guide rails 10 and 12 in a shift hindrance state, the engaging parts 66 of the synthetic resin slider 54 engage with the notches 40 of the synthetic resin guide rail 12. In this state, the spring 70 biases the nut 56 upwards in FIG. 3 through the stop ring 72 and the C-ring 74. Hence, the engaging parts 66 are biased by the spring 70 in the insert direction into the notches 40. In this state, vertical surfaces 66a of the engaging parts 66 engage with the vertical cut-in edge parts 44 of the notches 40, with the result that the slide member 50 is hindered from being lowered in the down direction (arrowed direction B).

In this state, when pushing the nut 56 upwards (arrowed direction A), inclined surfaces 66b of the engaging parts 66 slide along inclined surfaces 46 of then notches 40. The inclined surfaces 66b, as indicated by an arrowhead U of FIG. 4, run over the protrusions 42 and enter the notches 40 adjacent thereto. Subsequently, when pushing further the nut 56 upwards, the slide member 50 is pushed up to a desired height (i.e., moved in the arrowed direction A). Upon a release of the hand from the nut 56, the engaging parts 66 engage with the notches 40 substantially at that place and then stop. In this state, the vertical surfaces 66a impinge on the vertical surfaces 44 and it follows that the slide member 50 remains stopped.

The slide member 50 may be pulled down (arrowed direction B) by intruding the nut 56. Namely, if pulled down in this way, as indicated by D of FIG. 4, the synthetic resin slider 54 moves in the release direction till the vertical surfaces 66a of the engaging parts 66 come out of the vertical surfaces 44 of the notches 40. Subsequently, the slider 54 slides downwards (direction B). The slide member 50 continues to slide downwards till the hand releases from the nut 56. The engaging parts 66 enter the notches 40 upon the release from the hand. At that place, the slide member 50 is engaged with the guide rail 12.

The slide member 50 can be stopped at the desired height in the manner discussed above. When the vehicle is in a normal state, the engaging parts 66 of the synthetic resin slider 54 engage with the notches 40 of the synthetic resin guide rail 12. The slide member 50 is thereby stopped at the predetermined height. Then, shoulder anchor of the seat belt device is held at that height.

In this state, if an emergence (e.g., collision) happens in the vehicle, an intensive pull-down force is exerted on the nut 56 through the shoulder anchor and the seat belt. Deformed slightly at this time are the protrusions 42 of the synthetic resin guide rail 12 and the engaging parts 66 of the synthetic resin slider 54. The pawls 34 of the metal guide rail 10 impinge directly on side surface portions 62a of the engagement holes 62 of the metal slider 52. As a result, there is developed a state where the metal slider 52 having a high rigidity engages directly with the metal guide rail 10 having a high rigidity. Hence, this shoulder adjuster gives a resistance against a large acceleration to be applied to a human body. Thus, the human body can be strongly restrained.

Note that when sliding the slide member 50, the synthetic resin slider 54 impinges on the synthetic resin guide rail 12 with no metal touch. For this reason, working sounds caused during the slide are small, and no metal sound is generated even when vibrations of the vehicle are conveyed.

As discussed above, the shoulder adjuster of this invention requires no member for thrusting the engaging parts in the release direction. Besides, the slide member can be pushed upwards simply by thrusting up the slide member. Further, the slide member is slightly intruded and pulled downwards. With this arrangement, the slide member can be pulled in the downward direction. A setting height of the shoulder anchor can be therefore adjusted with a high simplicity. Besides, the operating method of the shoulder adjuster can be comprehended without referring to the operation manual and the like, thereby presenting a high expediency.

Although the illustrative embodiment of the present invention has been described with reference to the accompanying drawings, it is to be understood that the present invention is not limited that embodiment. Various changes or modifications may be effected thereby by one skilled in the art without departing from the scope or spirit of the invention.

What is claimed is:

1. A shoulder adjuster for a vehicle comprising:
    an elongated guide rail fixed to the vehicle to extend in a vertical direction, said guide rail including flanges at side fringes thereof, said flanges being formed by folding the guide rail rearwardly, a plurality of notches formed in the respective flanges at intervals in a longitudinal direction, and a slot situated between the flanges and extending in the longitudinal direction of the guide rail,
    a slide member attached to the guide rail to slide along the longitudinal direction thereof and having engaging parts engaging the notches of the guide rail, and
    an anchor fitting part having a lower side attached to the slide member, an upper side adapted to attach to a shoulder anchor for a seat belt, and an elastic member situated between the guide rail and the anchor fitting part for urging the anchor fitting part in a direction away from the guide rail to thereby bias the engaging parts of the slide member to the notches of the guide rail so that when the upper side of the anchor fitting part is pushed against a biasing force of the elastic member, the engaging parts of the slide member disengage from the notches of the guide rail to allow the anchor fitting part to move freely.

2. The shoulder adjuster as set forth in claim 8, wherein said anchor fitting part is intruded resisting the biasing force of said elastic member when pushing said anchor fitting part in a direction vertical to said guide rail, said engaging parts separate from said notches, and said slide member becomes movable in a downward direction of said guide rail.

3. The shoulder adjuster as set forth in claim 2, wherein said engaging parts are biased by said elastic member and enter said notches of said guide rail when the pushing force on said anchor fitting part is released.

4. The shoulder adjuster as set forth in claim 1, wherein said elastic member is a coil spring.

5. The shoulder adjuster as set forth in claim 4, wherein a portion of said anchor fitting part is disposed on the rear side of said guide rail, a portion of said anchor fitting part is protruded on a front side of said guide rail via said slot, and said coil spring is wound on said portion protruded on the front side.

6. A shoulder adjuster for a vehicle comprising:
    an elongated guide rail fixed to the vehicle to extend in a vertical direction and having a plurality of notches at intervals in a longitudinal direction, each notch having a lower cut-in edge part orthogonal to the longitudinal direction of the guide rail and an upper cut-in edge part obliquely to the longitudinal direction of the guide rail to expand an aperture of the notch,
    a slide member attached to the guide rail to slide along the longitudinal direction thereof and having engaging parts engaging the notches of the guide rail, and
    an anchor fitting part having a lower side attached to the slide member, an upper side adapted to attach to a shoulder anchor for a seat belt, and an elastic member situated between the guide rail and the anchor fitting part for urging the anchor fitting part in a direction away from the guide rail to thereby bias the engaging parts of the slide member to the notches of the guide rail so that when the upper side of the anchor fitting part is pushed against a biasing force of the elastic member, the engaging parts of the slide member disengage from the notches of the guide rail to allow the anchor fitting part to move freely.

* * * * *

UNITED STATES PATENT AND TRADEMARK OFFICE
CERTIFICATE OF CORRECTION

PATENT NO. : 5,205,588

DATED : April 27, 1993

INVENTOR(S) : Mikimasa Yamaoka et al

It is certified that error appears in the above-identified patent and that said Letters Patent is hereby corrected as shown below:

In column 6, line 9, please change "8" to --1--.

Signed and Sealed this

Twenty-second Day of February, 1994

Attest:

BRUCE LEHMAN

*Attesting Officer*     *Commissioner of Patents and Trademarks*